United States Patent
Chouai et al.

(10) Patent No.: US 8,354,471 B2
(45) Date of Patent: Jan. 15, 2013

(54) ACRYLIC ELECTROCOAT COMPOSITION AND PROCESS REPLACING PHOSPHATE PRETREATMENT

(75) Inventors: Abdellatif Chouai, Lake Jackson, TX (US); Timothy S. December, Rochester Hills, MI (US); Cynthia A. Stants, Pinckney, MI (US); Jennifer M. Lear, Clinton Twp., MI (US); Robert D. Schiller, South-Lyon, MI (US); Charles L. Tazzia, Grosse Ponte Farms, MI (US); Gregory G. Menovcik, Northville, MI (US)

(73) Assignee: BASF Coatings GmbH, Münster (DE)

( * ) Notice: Subject to any disclaimer, the term of this patent is extended or adjusted under 35 U.S.C. 154(b) by 937 days.

(21) Appl. No.: 12/345,351

(22) Filed: Dec. 29, 2008

(65) Prior Publication Data

US 2010/0167070 A1 Jul. 1, 2010

(51) Int. Cl.
 *C08G 67/02* (2006.01)
 *C25D 13/04* (2006.01)
(52) U.S. Cl. ......... 524/612; 524/500; 204/506; 204/510
(58) Field of Classification Search .................. 524/612, 524/500; 204/506, 510
See application file for complete search history.

(56) References Cited

U.S. PATENT DOCUMENTS

| | | |
|---|---|---|
| 4,164,487 A | 8/1979 | Martin |
| 4,289,812 A | 9/1981 | Martin |
| 4,321,335 A | 3/1982 | Arimoto et al. |
| 4,397,970 A | 8/1983 | Campbell et al. |
| 4,425,451 A | 1/1984 | Sekmakas et al. |
| 4,461,857 A | 7/1984 | Sekmakas et al. |
| 4,487,859 A | 12/1984 | Martino |
| 4,508,765 A | 4/1985 | Ring et al. |
| 4,600,754 A | 7/1986 | Winner |
| 4,692,484 A | 9/1987 | Roberts |
| 4,992,525 A | 2/1991 | Kriessmann et al. |
| 5,141,815 A | 8/1992 | Rickett |
| 5,264,469 A | 11/1993 | Mysliwczyk et al. |
| 5,389,704 A | 2/1995 | Yabu |
| 5,635,049 A | 6/1997 | Mysliwczyk et al. |
| 5,859,095 A | 1/1999 | Moyle et al. |
| 6,099,968 A * | 8/2000 | Harakawa et al. ............ 428/414 |
| 6,110,341 A | 8/2000 | McMurdie et al. |
| 6,319,988 B1 | 11/2001 | Barkac et al. |
| 6,777,034 B2 * | 8/2004 | Berger et al. ................. 427/410 |
| 6,942,902 B2 | 9/2005 | Sapper |
| 7,008,998 B2 | 3/2006 | Tazzia et al. |
| 7,030,185 B2 | 4/2006 | Tominaga et al. |
| 7,163,979 B2 | 1/2007 | Okazaki et al. |
| 7,268,171 B2 | 9/2007 | Tanaka et al. |
| 7,345,101 B2 | 3/2008 | Pawlik et al. |
| 7,531,074 B2 | 5/2009 | Purdy et al. |
| 7,674,874 B2 | 3/2010 | Gonzalez et al. |
| 2006/0127678 A1 | 6/2006 | Pawlik et al. |
| 2007/0244270 A1 | 10/2007 | December et al. |
| 2007/0275256 A1 | 11/2007 | Ragunathan et al. |
| 2008/0102214 A1 | 5/2008 | December et al. |
| 2008/0103268 A1 | 5/2008 | December et al. |
| 2008/0103269 A1 | 5/2008 | December et al. |
| 2008/0193664 A1 | 8/2008 | Gonzalez et al. |
| 2008/0194783 A1 | 8/2008 | Gonzalez et al. |
| 2008/0194843 A1 | 8/2008 | Gonzalez et al. |

FOREIGN PATENT DOCUMENTS

WO  WO 2008/127744   * 10/2008

* cited by examiner

*Primary Examiner* — Kishor Mayekar
(74) *Attorney, Agent, or Firm* — Harness, Dickey & Pierce, P.L.C.

(57) ABSTRACT

A coating composition, such as an electrodepositable electrocoat primer coating composition, comprises a phosphorylated acrylic polymer, The coating provides excellent corrosion protection even without a conventional phosphate pretreatment.

19 Claims, No Drawings

ACRYLIC ELECTROCOAT COMPOSITION AND PROCESS REPLACING PHOSPHATE PRETREATMENT

FIELD OF THE DISCLOSURE

The invention relates to electrocoat coating compositions, methods of preparing them, methods of electrodeposition of coatings onto a conductive substrate, and electrodeposited coatings.

BACKGROUND OF THE DISCLOSURE

The statements in this section merely provide background information related to this disclosure and may not constitute prior art.

Industrial coating of metal articles that will be used in corrosive environments may include application of one or more inorganic and organic treatments and coatings. Painting systems ("paint shops") in automotive assembly plants are large, complex, and expensive. Metal automotive vehicle bodies (the "body-in-white") and parts, for instance, are given a many-step treatment of cleaning in one or more cleaning baths or spray tanks, application of an aqueous phosphate coating material as a metal pretreatment step in a phosphating bath, then various rinses and additional finishing treatments, such as described in Claffey, U.S. Pat. No. 5,868,820. The phosphating pre-treatment steps are undertaken to improve corrosion resistance of the metal and adhesion of subsequent coatings to the metal. The cleaning and phosphating steps may have 10 or 12 individual treatment stations of spray equipment or dip tanks.

An electrodeposition coating ("electrocoat") is applied after the pretreatment steps to the metal vehicle body. Electrocoat baths usually comprise an aqueous dispersion or emulsion of a principal film-forming resin ("polymer" and "resin" are used interchangeably in this disclosure), having ionic stabilization in water or a mixture of water and organic cosolvent. In automotive or industrial applications for which durable electrocoat films are desired, the electrocoat compositions are formulated to be curable (thermosetting) compositions. This is usually accomplished by emulsifying with the principal film-forming resin a crosslinking agent that can react with functional groups on the principal resin under appropriate conditions, such as with the application of heat, and so cure the coating. During electrodeposition, coating material containing the ionically-charged resin having a relatively low molecular weight is deposited onto a conductive substrate by submerging the substrate in the electrocoat bath and then applying an electrical potential between the substrate and a pole of opposite charge, for example, a stainless steel electrode. The charged coating material migrates to and deposits on the conductive substrate. The coated substrate is then heated to cure or crosslink the coating.

One of the advantages of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even, continuous coating layer over all portions of the metallic substrate provides maximum anti-corrosion effectiveness. The phosphate pre-treatment, however, has up to now been an indispensable step in protecting against corrosion for automotive vehicle bodies. McMurdie et al., U.S. Pat. No. 6,110,341 teaches that hydrocarbyl phosphate and phosphonic acid esters, which may include poly- epoxide linking groups, can be incorporated into electrodeposition baths in amounts of up to 500 ppm on total bath weight for improved corrosion protection. Examples including phenylphosphonic acid were reported to have a modest increase in corrosion protection over untreated steel panels.

SUMMARY OF THE DISCLOSURE

We disclose a composition and process for electrodepositing an electrocoat coating on an unphosphated metal substrate (that is, a metal substrate that has not undergone a phosphate pretreatment) in which the electrocoat coating provides excellent corrosion protection. Elimination of the steps and equipment for the phosphating pretreatment process permits a major cost savings in construction of a new paint shop, as well as a simplification and cost savings in operating paint shops now in automotive manufacturing plants.

The process uses an aqueous electrocoat coating composition, also called an electrocoat bath, with a binder comprising a cathodically electrodepositable coating including a vinyl, e.g. acrylic, polymer having at least one phosphorous-containing group

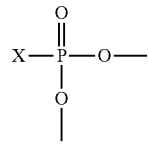

in which X is a hydrogen, a monovalent hydrocarbon group (i.e., hydrocarbyl group), an alkyl group such as an aminoalkyl group, an aryl group, an alkylaryl group, an arylalkyl group, or an oxygen atom having a single covalent bond to the phosphorous atom, and each oxygen atom has a covalent bond to a hydrogen atom, an alkyl group, an aryl group, an alkylaryl group, an arylalkyl group, or the acrylic polymer, with the caveat that at least one oxygen atom has a covalent bond to the acrylic polymer. The alkyl groups may be cycloalkyl groups. The alkyl and aryl groups may be hydrocarbyl groups or may include heteroatoms. For convenience, "polymer" and "resin" are used interchangeably in this disclosure to encompass resin, oligomer, and polymer, and the acrylic polymer having the phosphorous-containing group will be referred to as a phosphorylated acrylic polymer. "Binder" refers to the film-forming components of the coating composition. Typically the binder is thermosetting or curable. The phosphorylated acrylic polymer may itself be electrodepositable, i.e., it may be amine-functional for cathodic electrodeposition or acid-functional for anodic electrodeposition, or the binder may include a further polymer that is electrodepositable. An acrylic polymer is a vinyl polymer prepared by addition polymerization of at least one acrylate or methacrylate monomer, optionally with other vinyl monomers. For convenience, "acrylic" and "vinyl" will be used interchangeably to refer to polymers of vinyl monomers (such as acrylate and mehacylate monomers), as typically at least one acrylate or methacrylate monomer is copolymerized.

In one embodiment, the phosphorylated acrylic polymer comprises a monophosphate ester or monophosphonic acid ester of the acrylic polymer (i.e., one oxygen is covalently bonded to both phosphorous atom and acrylic polymer). In another embodiment, the phosphorylated acrylic polymer comprises a diphosphate ester, triphosphate ester, or diphosphonic acid ester of the acrylic polymer. In other embodiments, the phosphorylated acrylic polymer includes a combination of these esters. The remaining oxygens on the phosphorous atom that are not covalently bound between the polymer and the phosphorous atom may also be esterified with an alkyl group, an aryl group, an alkylaryl group, or an arylalkyl group. In certain embodiments, at least one P—OH group remains unesterified; that is, in these embodiments the phosphorous containing group has at least one P—OH group.

In various embodiments, the phosphorylated acrylic polymer has one phosphorous-containing group or a plurality of phosphorous-containing groups. The phosphorylated acrylic polymer may be prepared using an acrylic polymer with at least one epoxide group or hydroxyl group, or a plurality of such groups, that is reacted with a P—OH group of a phosphorous-containing compound.

In certain embodiments, the phosphorylated acrylic polymer is amine-functional and may be from about 0.01 to about 99% by weight of the total binder in the electrodeposition coating composition. Among these embodiments are those in which the phosphorylated acrylic polymer is from about 1 to about 90% by weight of total binder in the electrodeposition coating composition and those in which the phosphorylated acrylic polymer is from about 5 to about 80% by weight of total binder in the electrodeposition coating composition. In certain embodiments, the binder comprises a crosslinker reactive during cure with the phosphorylated acrylic polymer. In certain embodiments, the binder comprises a second amine-functional resin other than the phosphorylated acrylic polymer. In any of these embodiments, the binder may also comprises a crosslinker that reacts during cure of the electrodeposited coating layer with the phosphorylated acrylic polymer, the second amine-functional resin, or both.

We also disclose a method of coating an electrically conductive substrate, such as a metal automotive vehicle body or part, which comprises placing the electrically conductive substrate into the aqueous electrodeposition coating composition having an electrodepositable binder comprising a phosphorylated acrylic polymer and, using the electrically conductive substrate as one electrode, passing a current through the aqueous electrodeposition coating composition to deposit a coating layer comprising the binder onto the electrically conductive substrate. In certain embodiments of the method, the binder is cathodically electrodepositable and the substrate is a cathode. The deposited coating layer may then be cured to a cured coating layer. Subsequent coating layers may be applied on the (optionally cured) electrodeposited coating layer. For example, the electrodeposited coating layer may be a primer layer and other layers such as an optional spray-applied primer surfacer and a topcoat layer or topcoat layers (e.g., a colored basecoat layer and a clearcoat layer) may be applied over the electrodeposited coating layer. All coating layers may be cured.

In one embodiment of the method, the electrically conductive substrate is unphosphated before it is coated with an electrodeposited coating comprising the phosphorylated acrylic resin; that is, the substrate is free of a phosphate pre-treatment.

In one embodiment of the method, a metal automotive vehicle body is cleaned, and the cleaned metal automotive vehicle body is electrodeposited with an aqueous coating composition comprising an electrodepositable binder comprising a phosphorylated acrylic polymer. Thus, no phosphate pretreatment is used. The binder of the electrocoat coating composition may include a second, amine-functional resin that does not have phosphorous-containing groups, and generally a crosslinker reactive with one or both of the phosphorylated acrylic polymer and the amine-functional resins is included in the coating composition so that the electrodeposited coating layer may be cured.

A coated, electrically conductive substrate comprises an electrically deposited coating layer on the substrate, the electrically deposited coating layer comprising a cured coating formed from a binder comprising a phosphorylated acrylic polymer. In various embodiments, the binder further comprises a crosslinker reactive with the phosphorylated acrylic resin, a second resin in the binder, or both that reacts during cure to form the cured coating.

The phosphorous-containing groups incorporated into the coating composition provide significant improvement in corrosion protection over untreated, particularly unphosphated, metallic substrates such as cold rolled steel, while the acrylic-containing binder allows coatings to be made in a range of colors not possible with an epoxy-based binder system because of the yellow color of most epoxy resins. In addition, an acrylic polymer is more durable when the coating is subjected to outdoor exposure. Further, the phosphorous-containing groups can be easily included in any fraction of monomer units of the acrylic polymer.

"A," "an," "the," "at least one," and "one or more" are used interchangeably to indicate that at least one of the item is present; a plurality of such items may be present. Other than in the working examples provides at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

A metal substrate, which may be unphosphated, is electrocoated with an aqueous electrocoat coating composition having a binder comprising a phosphorylated acrylic polymer. The phosphorylated acrylic polymer either is electrodepositable itself—that is, it has amine or acid functionality—or the binder contains a second polymer that has amine or acid functionality so that the binder is electrodepositable. The electrodeposited coating layer may be cured and may be overcoated with one or more additional coating layers. The phosphorylated acrylic polymer has at least one covalently bonded, phosphorous-containing group having a structure

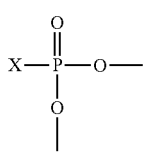

in which X is a hydrogen, a monovalent hydrocarbon group (i.e., hydrocarbyl group), an alkyl group such as an aminoalkyl group, an aryl group, an alkylaryl group, an arylalkyl group, or an oxygen atom having a single covalent bond to the phosphorous atom, and each oxygen atom has a covalent bond to a hydrogen atom, an alkyl group, an aryl group, an alkylaryl group, an arylalkyl group, or the acrylic polymer, with the caveat that at least one oxygen atom has a covalent bond to the acrylic polymer. In each case, an alkyl group may be a cycloalkyl group and the alkyl or aryl groups may include one or more heteroatoms.

A phosphorylated vinyl or acrylic polymer may be prepared by esterifying a vinyl or acrylic polymer having epoxide or hydroxyl functionality or both with a phosphorous-containing acid or esterifiable derivative, or may be prepared by addition polymerizing a ethylenically unsaturated monomer that has the phosphorous-containing group or has been esterified with the phosphorous-containing acid or acid derivative. Reaction of the phosphorous-containing acid or esterifiable derivative with a hydroxyl group produces an ester linkage, while reaction with an epoxide group produces and ester linkage with a hydroxyl group on a beta carbon.

Nonlimiting, suitable examples of addition polymerizable monomers that may be reacted with the phosphorous-containing acid or derivative or that can be copolymerized to provide a hydroxyl or epoxide group on the acrylic polymer for reaction with the phosphorous-containing acid or derivative include, without limitation, hydroxyethyl acrylate, hydroxyethyl methacrylate, hydroxypropyl acrylate, hydroxypropyl methacrylate, hydroxybutyl acrylate, hydroxybutyl methacrylate, allyl alcohol, glycidyl acrylate, glycidyl methacrylate, and allyl glycidyl ether; these may be used in combinations. If hydroxyl or epoxide groups are also to be used as crosslinkable functionality during cure of the coating, the amount of hydroxyl or epoxide groups incorporated is increased over what is needed for reaction with the phosphorous-containing acid or esterifiable derivative to provide the desired residual amount of the hydroxyl or epoxide groups for crosslinking during cure.

The addition polymerizable monomer bearing the hydroxyl, epoxide, or phosphorous-containing group may be copolymerized with other addition polymerizable monomers in forming the acrylic polymer. Nonlimiting examples of suitable comonomers include α,β-ethylenically unsaturated monocarboxylic acids containing 3 to 5 carbon atoms and ethylenically unsaturated dicarboxylic acid and anhydrides; esters, nitriles, or amides of α,β-ethylenically unsaturated monocarboxylic acids containing 3 to 5 carbon atoms and ethylenically unsaturated dicarboxylic acid and anhydrides; vinyl esters, vinyl ethers, vinyl ketones, vinyl amides, and vinyl compounds of aromatics and heterocycles. Representative examples include acrylic and methacrylic acids, amides, and aminoalkyl amides; acrylonitrile and methacrylonitriles; esters of acrylic and methacrylic acid, including those of saturated aliphatic and cycloaliphatic alcohols containing 1 to 20 carbon atoms such as methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, t-butyl acrylate, t-butyl methacrylate, amyl acrylate, amyl methacrylate, isoamyl acrylate, isoamyl methacrylate, hexyl acrylate, hexyl methacrylate, 2-ethylhexyl acrylate, 2-ethylhexyl methacrylate, decyl acrylate, decyl methacrylate, isodecyl acrylate, isodecyl methacrylate, dodecyl acrylate, dodecyl methacrylate, cyclohexyl acrylate, cyclohexyl methacrylate, substituted cyclohexyl acrylates and methacrylates, 3,5,5-trimethylhexyl acrylate, 3,5,5-trimethylhexyl methacrylate; dimethylaminoethyl, tert-butyl amino, tetrahydrofurfuryl, and isobornyl acrylates and methacrylates; the corresponding esters of maleic, fumaric, crotonic, isocrotonic, vinylacetic, and itaconic acids, and the like, such as maleic acid dimethyl ester and maleic acid monohexyl ester; vinyl monomers such as vinyl acetate, vinyl propionate, vinyl ethyl ether, and vinyl ethyl ketone, styrene, α-methyl styrene, vinyl toluene, 2-vinyl pyrrolidone, t-butyl styrene, and the like. Other useful polymerizable co-monomers include, for example, alkoxyethyl acrylates and methacrylates, acryloxy acrylates and methacrylates, and compounds such as acrylonitrile, methacrylonitrile, acrolein, and methacrolein. Combinations of these are usually employed.

Acrylic polymers may be prepared by using conventional techniques, such as free radical polymerization, cationic polymerization, or anionic polymerization, in, for example, a batch, semi-batch, or continuous feed process. For instance, the polymerization may be carried out by heating the ethylenically unsaturated monomers in bulk or in solution in the presence of a free radical source, such as an organic peroxide or azo compound and, optionally, a chain transfer agent, in a batch or continuous feed reactor. Alternatively, the monomers and initiator(s) may be fed into the heated reactor at a controlled rate in a semi-batch process.

Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cyclohexanecarbonitrile). Typical chain transfer agents are mercaptans such as octyl mercaptan, n- or tert-dodecyl mercaptan, thiosalicylic acid, mercaptoacetic acid, and mercaptoethanol; halogenated compounds, and dimeric alpha-methyl styrene. The free radical polymerization is usually carried out at temperatures from about 20° C. to about 250° C., preferably from 90° C. to 170° C. The reaction is carried out according to conventional methods to produce a vinyl copolymer.

Suitable phosphorous containing acid derivatives that may be reacted with an epoxide- or hydroxyl-functional acrylic polymer or monomer include esterifiable esters and anhydrides of phosphorous-containing acids. Among suitable examples. are those —$P(OR)_2$=O group-containing acids or acid derivatives having at least one R that is a hydrogen atom or a lower alkyl group (up to four carbon atoms, particularly methyl, ethyl, propyl, isopropyl, and tert-butyl) than can be transesterified, such as phosphoric acid, a mono- or diester of phosphoric acid, hypophosphoric acid, a monoester of hypophosphoric acid, alkyl- or arylphosphonic acid, a monoester of alkyl- or arylphosphonic acid, and combinations of these. Phosphoric acid or a source of phosphoric acid that used in the reaction may be nonaqueous phosphoric acid, 85% in water, a more dilute aqueous phosphoric acid, pyrophosphoric acid, or polyphosphoric acid. Other suitable phosphoric acid sources are described in Campbell et al., U.S. Pat. No. 4,397,970, incorporated herein by reference. The acrylic polymer has at least one epoxide or hydroxyl group for reaction with the phosphorous-containing acid or acid derivative.

The phosphorous-containing acid or acid derivative may be reacted with a polymerizable monomer before polymerization of the acrylic polymer or with the acrylic polymer during or after polymerization. The reaction with the acid or acid derivative with polymer or monomer may be carried out at a temperature of from about 50° C. to about 150° C. in solvent such as any of those already mentioned, or neat. If carried out before polymerization (that is, with an addition polymerizable, ethylenically unsaturated monomer), it is advisable to use a small amount of polymerization inhibitor (e.g., hydroquinone or methylhydroquinone) to preserve the addition polymerizable unsaturated group. Suitable solvents include, without limitation, inert organic solvent such as a ketone, including methyl isobutyl ketone and methyl amyl ketone, aromatic solvents such as toluene, xylene, Aromatic 100, and Aromatic 150, and esters, such as butyl acetate, n-propyl acetate, hexyl acetate.

The phosphorylated acrylic polymer may include monophosphonic acid esters, diphosphonic acid esters, monophosphate ester, diphosphate esters, and triphosphate esters of the acrylic polymer, as well as combinations of these. In addition, the phosphorylated acrylic polymer may have one or a plurality of the phosphorous-containing ester groups. The extent of esterification by the phosphorous-containing acid or acid derivative and the number of phosphorous-containing ester groups incorporated into the resin may be controlled, inter alia, by the relative equivalents of the reactants. In one example, from about 1 to about 3 equivalents of vinyl or acrylic polymer (based on epoxide and/or hydroxyl groups) is reacted with each equivalent of phosphoric acid or phosphoric acid derivative. In another example, from about 1 to about 2 equivalents of acrylic polymer (based on epoxide and hydroxyl groups) is reacted with each equivalent of phosphonic acid or phosphonic acid derivative. The equivalents of the polymer reactive groups may also be in excess of the equivalents of acid or acid derivative. The polymer and phosphoric or phosphonic acid or acid derivative may be mixed together and allowed to react until a desired extent of reaction is obtained. In some embodiments, the acrylic or vinyl polymer has from about 0.01 to about 1 milliequivalents phosphorous-containing groups per gram; in some embodiments, the acrylic or vinyl polymer has from about 0.01 to about 0.1 milliequivalents phosphorous-containing groups per gram.

Other reactants that may be used in the phosphorylation reaction in addition to the acrylic polymer and phosphorous-containing acid or acid derivative may include alkyl or aromatic alcohols such as n-butanol, isopropanol, and n-propanol; glycol ethers such as ethylene glycol monobutyl ether, propylene glycol monobutyl ether, and propylene glycol monopropyl ether; alkyl or aromatic amines such as dimethylethanolamine, diethanolamine, dipropanolamine, diisopropanolamine, dibutanolamine, diisobutanolamine, diglycolamine, methylethanolamine, dimethylaminopropylamine; water; and combinations of these. Such reactants can also be used to react with excess oxirane or hydroxyl groups after the reaction of the acrylic polymer with the acid or acid derivative. Similarly, such other reactants may be included when a polymerizable monomer having an epoxide or hydroxyl group is reacted with the phosphorous-containing acid or acid derivative before polymerization of the acrylic polymer.

The acrylic resins may be made anodically electrodepositable by incorporation of acid functionality, for example by polymerization of acid-containing monomers such as acrylic acid, methacrylic acid, unsaturated dicarboxylic acids or cyclic anhydrides of these. The acrylic resins may be made cathodically electrodepositable by incorporation of amine functionality, for example by polymerization of amino-containing monomers such as N,N'-dimethylaminoethyl methacrylate, tert-butylaminoethyl methacrylate. N,N'-dimethylaminoethyl acrylate, tert-butylaminoethyl acrylate. 2-vinylpyridine, 4-vinylpyridine, vinylpyrrolidine or other such amino monomers. Alternatively, epoxide groups may be incorporated by including an epoxide-functional monomer in the polymerization reaction (or an excess over that required for reaction with the phosphorous-containing acid or reactive derivative) and then reacted with an amine such as a secondary amine. If the epoxide groups area also used to introduce the phosphorous-containing group onto the acrylic polymer, a sufficient amount of epoxide groups are incorporated for both purposes. The amine functionality may be imparted to the acrylic polymer with epoxide functionality in one of two ways. In a first way, an amine having at least one active hydrogen reactive with an epoxide group is included as a reactant in the reaction of the epoxide-functional resin and phosphorous-containing acid or source of phosphorous-containing acid. In a second way, the phosphorylated acrylic polymer is formed as an epoxide-functional product that is then further reacted with an amine having at least one active hydrogen reactive with an epoxide group. Examples of suitable amine compounds include, without limitation, dimethylaminopropylamine, N,N-diethylaminopropylamine, dimethylaminoethylamine, N-aminoethylpiperazine, aminopropylmorpholine, tetramethyldipropylenetriamine, methylamine, ethylamine, dimethylamine, dibutylamine, ethylenediamine, diethylenetriamine, triethylenetetramine, dimethylaminobutylamine, diethylaminopropylamine, diethylaminobutylamine, dipropylamine, methylbutylamine, alkanolamines such as methylethanolamine, aminoethylethanolamine, aminopropylmonomethylethanolamine, and diethanolamine, diketimine (a reaction product of 1 mole diethylenetriamine and 2 moles methyl isobutyl ketone), and polyoxyalkylene amines.

The monomer(s) bearing the epoxide group, hydroxyl group, and/or phosphorous-containing group and the monomer bearing the group for salting (amine for a cationic group or acid or anhydride for anionic group) may be polymerized with one or more other ethylenically unsaturated monomers, such as those already mentioned.

The phosphorylated acrylic polymer is used to prepare an electrocoat coating composition (also known as an electrocoat bath). In general, a binder is prepared comprising the phosphorylated acrylic polymer, then the binder is dispersed in an aqueous medium by salting amine groups present in the binder with an acid to give a cathodically depositable electrocoat composition or by salting acid groups present in the binder with an amine to give an anodically-depositable electrocoat composition and combining the salted binder with an aqueous medium.

In certain embodiments, the binder in the electrodeposition coating composition comprises from about 0.01 to about 99% by weight of phosphorylated acrylic polymer. The binder in the electrodeposition coating composition may comprise from about 0.01 to about 99% by weight of phosphorylated acrylic polymer, 1 to about 90% by weight of phosphorylated acrylic polymer, or from about 5 to about 80% by weight of phosphorylated acrylic polymer.

If the phosphorylated acrylic polymer does not have amine or acid functionality, then the binder comprises a second polymer than is amine-functional or acid-functional that makes the binder electrodepositable. The second resin may be made an acrylic resin that is made amine-functional as described above by incorporation of amino-containing monomers, such as N,N'-dimethylaminoethyl methacrylate tert-butylaminoethyl methacrylate. N,N'-dimethylaminoethyl acrylate tert-butylaminoethyl acrylate. 2-vinylpyridine, 4-vinylpyridine, vinylpyrrolidine or other such amino monomers or by reaction of epoxide groups with amines as previously described, or that is made acid-functional by incorporation of a polymerizable acid such as those already mentioned. The polymerization may also include a hydroxyl-functional monomer to provide crosslinkable functional groups. Useful hydroxyl-functional ethylenically unsaturated monomers include, without limitation, hydroxyethyl methacrylate, hydroxyethyl acrylate, hydroxypropyl acrylate, hydroxypropyl methacrylate, hydroxybutyl acrylate, hydroxybutyl methacrylate, the reaction product of methacrylic acid with styrene oxide, and so on. Preferred hydroxyl monomers are methacrylic or acrylic acid esters in which the hydroxyl-bearing alcohol portion of the compound is a linear or branched hydroxy alkyl moiety having from 1 to about 8 carbon atoms.

The monomer bearing the hydroxyl group and the monomer bearing the amine or epoxide group or the acid group may be polymerized with any of the other ethylenically unsaturated monomers already mentioned in connection with the phosphorylated acrylic polymer. Combinations of comonomers are usually employed.

The binder may also comprise a crosslinker that reacts with the amine-functional resin other than the phosphorylated resin during curing of a coating layer formed on a substrate, or the binder may also comprise a crosslinker that reacts with both the amine-functional resin other than the phosphorylated resin and the phosphorylated resin during curing of a coating layer formed on a substrate. Suitable examples of crosslinking agents, include, without limitation, blocked polyisocyanates and aminoplast resins. Examples of aromatic, aliphatic or cycloaliphatic polyisocyanates include diphenylmethane-4, 4'-diisocyanate (MDI), 2,4- or 2,6-toluene diisocyanate (TDI), p-phenylene diisocyanate, tetramethylene diisocyanate, hexamethylene diisocyanate, dicyclohexylmethane-4,4'-diisocyanate, isophorone diisocyanate, mixtures of phenylmethane-4,4'-diisocyanate, polymethylene polyphenylisocyanate, 2-isocyanatopropylcyclohexyl isocyanate, dicyclohexylmethane 2,4'-diisocyanate, 1,3-bis(isocyanatomethyl)cyclohexane, diisocyanates derived from dimer fatty acids, as sold under the commercial designation DDI 1410 by Henkel, 1,8-diisocyanato-4-isocyanatomethyloctane, 1,7-diisocyanato-4-isocyanato-methylheptane or 1-isocyanato-2-(3-isocyanatopropyl)-cyclohexane, and higher polyisocyanates such as triphenylmethane-4,4',4"-triisocyanate, or mixtures of these polyisocyanates. Suitable polyisocyanates also include polyisocyanates derived from these that containing isocyanurate, biuret, allophanate, iminooxadiazinedione, urethane, urea, or uretdione groups. Polyisocyanates containing urethane groups, for example, are obtained by reacting some of the isocyanate groups with polyols, such as trimethylolpropane, neopentyl glycol, and glycerol, for example. The isocyanate groups are reacted with a blocking agent. Examples of suitable blocking agents include phenol, cresol, xylenol, epsilon-caprolactam, delta-valerolactam, gamma-butyrolactam, diethyl malonate, dimethyl malonate, ethyl acetoacetate, methyl acetoacetate, alcohols such as methanol, ethanol, isopropanol, propanol, isobutanol, tert-butanol, butanol, glycol monoethers such as ethylene or propylene glycol monoethers, acid amides (e.g. acetanilide), imides (e.g. succinimide), amines (e.g. diphenylamine), imidazole, urea, ethylene urea, 2-oxazolidone, ethylene imine, oximes (e.g. methylethyl ketoxime), and the like.

As understood by those skilled in the art, an aminoplast resin is formed by the reaction product of formaldehyde and amine where the preferred amine is a urea or a melamine. Although urea and melamine are the preferred amines, other amines such as triazines, triazoles, diazines, guanidines, or guanamines may also be used to prepare the aminoplast resins. Furthermore, although formaldehyde is preferred for forming the aminoplast resin, other aldehydes, such as acetaldehyde, crotonaldehyde, and benzaldehyde, may also be used. Nonlimiting examples of suitable aminoplast resins include monomeric or polymeric melamine-formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like.

Optionally, plasticizer or solvents or both can be added to the electrocoat coating composition. Nonlimiting examples of coalescing solvents include alcohols, glycol ethers, polyols, and ketones. Specific coalescing solvents include monobutyl and monohexyl ethers of ethylene glycol, phenyl ether of propylene glycol, monoalkyl ethers of ethylene glycol such as the monomethyl, monoethyl, monopropyl, and monobutyl ethers of ethylene glycol or propylene glycol; dialkyl ethers of ethylene glycol or propylene glycol such as ethylene glycol dimethyl ether and propylene glycol dimethyl ether; butyl carbitol; diacetone alcohol. Nonlimiting examples of plasticizers include ethylene or propylene oxide adducts of nonyl phenols, bisphenol A, cresol, or other such materials, or polyglycols based on ethylene oxide and/or propylene oxide. The amount of coalescing solvent is not critical and is generally between about 0 to 15 percent by weight, preferably about 0.5 to 5 percent by weight based on total weight of the resin solids. Plasticizers can be used at levels of up to 15 percent by weight resin solids.

An amine-functional binder is emulsified in water in the presence of an acid or an acid-functional binder is emulsified in water in the presence of a base. Nonlimiting examples of suitable acids include phosphoric acid, phosphonic acid, propionic acid, formic acid, acetic acid, lactic acid, or citric acid. Nonlimiting examples of suitable bases include ammonia and amines. The salting acid or base may be blended with the binder, mixed with the water, or both, before the binder is added to the water. The acid or base is used in an amount sufficient to neutralize enough of the amine or acid groups to impart water-dispersibility to the binder. The amine or acid groups may be fully neutralized; however, partial neutralization is usually sufficient to impart the required water-dispersibility. By saying that the resin is at least partially neutralized, we mean that at least one of the saltable groups of the binder is neutralized, and up to all of such groups may be neutralized. The degree of neutralization that is required to afford the requisite water-dispersibility for a particular binder will depend upon its composition, molecular weight of the resins, weight percent of saltable resin in the binder, and other such factors and can readily be determined by one of ordinary skill in the art through straightforward experimentation.

The binder emulsion is then used in preparing an electrocoat coating composition (or bath). The electrocoat bath may contain no pigment so as to produce a colorless or clear electrodeposited coating layer, but the electrocoat bath usually includes one or more pigments, generally added as part of a pigment paste, and may contain any further desired materials such as coalescing aids, antifoaming aids, and other additives that may be added before or after emulsifying the binder. The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silica, calcium carbonate, talc, barytes, ferric ammonium ferrocyanide (Prussian blue), ultramarine, lead chromate, lead molybdate, aluminum silicate, precipitated barium sulfate, aluminum phosphomolybdate, and mica flake pigments. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like. The pigments may be dispersed using a grind resin or a pigment dispersant. The pigment-to-resin weight ratio in the electrocoat bath can be important and should be preferably less than 50:100, more preferably less than 40:100, and usually about 10 to 30:100. Higher pigment-to-resin solids weight ratios have been found to adversely affect coalescence and flow. Usually, the pigment is 10-40 percent by weight of the nonvolatile material in the bath. Preferably, the pigment is 15 to 30 percent by weight of the nonvolatile material in the bath. Any of the pigments and fillers generally used in electrocoat primers may be included.

The electrodeposition coating compositions can contain optional ingredients such as dyes, flow control agents, plasticizers, catalysts, wetting agents, surfactants, UV absorbers, HALS compounds, antioxidants, defoamers and so forth. Examples of surfactants and wetting agents include alkyl imidazolines such as those available from Ciba-Geigy Industrial Chemicals as AMINE C® acetylenic alcohols such as those available from Air Products and Chemicals under the tradename SURFYNOL®. Surfactants and wetting agents, when present, typically amount to up to 2 percent by weight resin solids.

Curing catalysts such as tin catalysts can be used in the coating composition. Typical examples are without limitation, tin and bismuth compounds including dibutyltin dilaurate, dibutyltin oxide, and bismuth octoate. When used, catalysts are typically present in amounts of about 0.05 to 2 percent by weight tin based on weight of total resin solids.

The electrocoat coating composition is electrodeposited onto a metallic substrate and then cured to form a coated article. The electrodeposition of the coating preparations according to the invention may be carried out by processes known to those skilled in the art. The electrodeposition coating composition may be applied on any conductive substrate, such as steel, copper, aluminum, or other metals or metal alloys, preferably to a dry film thickness of 10 to 35 μm. In one embodiment of the method, the electrically conductive substrate is unphosphated; that is, it is free of a phosphate pretreatment The article coated with the composition of the invention may be a metallic automotive part or body. A method of coating an electrically conductive substrate, such as a metal automotive vehicle body or part, comprises placing an electrically conductive substrate, cleaned but preferably not given a phosphate pre-treatment, into the electrocoat coating composition and, using the electrically conductive substrate as the cathode, passing a current through the electrocoat coating composition causing a coating layer to deposit onto the electrically conductive substrate. After application, the coated article is removed from the bath and rinsed with deionized water. The coating may be cured under appropriate conditions, for example by baking at from about 275° F. to about 375° F. for between about 15 and about 60 minutes.

An automotive vehicle body may be electrocoated. The automotive vehicle body is cleaned, and the cleaned metal automotive vehicle body is electrocoated with an aqueous electrodeposition coating composition comprising the phosphorylated resin.

One or more additional coating layers, such as a spray-applied primer-surfacer, single topcoat layer, or composite color coat (basecoat) and clearcoat layer, may be applied over the electrocoat layer. A single layer topcoat is also referred to as a topcoat enamel. In the automotive industry, the topcoat is typically a basecoat that is overcoated with a clearcoat layer. A primer surfacer and the topcoat enamel or basecoat and clearcoat composite topcoat may be waterborne, solventborne, or a powder coating, which may be a dry powder or an aqueous powder slurry.

The composite coating of the invention may have, as one layer, a primer coating layer, which may also be termed a primer-surfacer or filler coating layer. The primer coating layer can be formed from a solventborne composition, waterborne composition, or powder composition, including powder slurry composition. The primer composition preferably has a binder that is thermosetting, although thermoplastic binders are also known. Suitable thermosetting binders may have self-crosslinking polymers or resins, or may include a crosslinker reactive with a polymer or resin in the binder. Nonlimiting examples of suitable binder polymers or resins include acrylics, polyesters, and polyurethanes. Such polymers or resins may include as functional groups hydroxyl groups, carboxyl groups, anhydride groups, epoxide groups, carbamate groups, amine groups, and so on. Among suitable crosslinkers reactive with such groups are aminoplast resins (which are reactive with hydroxyl, carboxyl, carbamate, and amine groups), polyisocyanates, including blocked polyisocyanates (which are reactive with hydroxyl groups and amine groups), polyepoxides (which are reactive with carboxyl, anhydride, hydroxyl, and amine groups), and polyacids and polyamines (which are reactive with epoxide groups). Examples of suitable primer compositions are disclosed, for example, in U.S. Pat. Nos. 7,338,989; 7,297,742; 6,916,877; 6,887,526; 6,727,316; 6,437,036; 6,413,642; 6,210,758; 6,099,899; 5,888,655; 5,866,259; 5,552,487; 5,536,785; 4,882,003; and 4,190,569, each assigned to BASF and each incorporated herein by reference.

The primer coating composition applied over the electrocoat primer may then be cured to form a primer coating layer. The electrocoat primer may be cured at the same time as the primer coating layer in a process known as "wet-on-wet" coating.

A topcoat composition may be applied over the electrocoat layer or primer coating layer and, preferably, cured to form a topcoat layer. In a preferred embodiment, the electrocoat layer or primer layer is coated with a topcoat applied as a color-plus-clear (basecoat-clearcoat) topcoat. In a basecoat-clearcoat topcoat, an underlayer of a pigmented coating, the basecoat, is covered with an outer layer of a transparent coating, the clearcoat. Basecoat-clearcoat topcoats provide an attractive smooth and glossy finish and generally improved performance.

Crosslinking compositions are preferred as the topcoat layer or layers. Coatings of this type are well-known in the art and include waterborne compositions, solventborne compositions, and powder and powder slurry compositions. Polymers known in the art to be useful in basecoat and clearcoat compositions include, without limitation, acrylics, vinyls, polyurethanes, polycarbonates, polyesters, alkyds, and polysiloxanes. Acrylics and polyurethanes are among preferred polymers for topcoat binders. Thermoset basecoat and clearcoat compositions are also preferred, and, to that end, preferred polymers comprise one or more kinds of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin. Examples of suitable topcoat compositions are disclosed, for example, in U.S. Pat. Nos. 7,375,174; 7,342,071; 7,297,749; 7,261,926; 7,226,971; 7,160,973; 7,151,133; 7,060,357; 7,045,588; 7,041,729; 6,995,208; 6,927,271; 6,914,096; 6,900,270; 6,818,303; 6,812,300; 6,780,909; 6,737,468; 6,652,919; 6,583,212; 6,462,144; 6,337,139; 6,165,618; 6,129,989; 6,001,424; 5,981,080; 5,855,964; 5,629,374; 5,601,879; 5,508,349; 5,502,101; 5,494,970; 5,281,443; and, each assigned to BASF and each incorporated herein by reference.

The further coating layers can be applied to the electrocoat coating layer according to any of a number of techniques well-known in the art. These include, for example, spray coating, dip coating, roll coating, curtain coating, and the like. For automotive applications, the further coating layer or layers are preferably applied by spray coating, particularly electrostatic spray methods. Coating layers of one mil or more are usually applied in two or more coats (passes), separated by a time sufficient to allow some of the solvent or aqueous medium to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

A primer layer may be cured before the topcoat is applied. The cured primer layer may be from about 0.5 mil to about 2 mils thick, preferably from about 0.8 mils to about 1.2 mils thick.

Color-plus-clear topcoats are usually applied wet-on-wet. The compositions are applied in coats separated by a flash, as described above, with a flash also between the last coat of the color composition and the first coat the clear. The two coating layers are then cured simultaneously. Preferably, the cured basecoat layer is 0.5 to 1.5 mils thick, and the cured clear coat layer is 1 to 3 mils, more preferably 1.6 to 2.2 mils, thick.

Alternatively the primer layer and the topcoat can be applied "wet-on-wet." For example, the primer composition can be applied, then the applied layer flashed; then the topcoat can be applied and flashed; then the primer and the topcoat can be cured at the same time. Again, the topcoat can include a basecoat layer and a clearcoat layer applied wet-on-wet. The primer layer can also be applied to an uncured electrocoat coating layer, and all layers cured together.

The coating compositions described are preferably cured with heat. Curing temperatures are preferably from about 70° C. to about 180° C., and particularly preferably from about 170° F. to about 200° F. for a topcoat or primer composition including an unblocked acid catalyst, or from about 240° F. to about 275° F. for a topcoat or primer composition including a blocked acid catalyst. Typical curing times at these temperatures range from 15 to 60 minutes, and preferably the temperature is chosen to allow a cure time of from about 15 to about 30 minutes. In a preferred embodiment, the coated article is an automotive body or part.

The invention is further described in the following example. The example is merely illustrative and does not in any way limit the scope of the invention as described and claimed. All parts are parts by weight unless otherwise noted.

EXAMPLES

Preparation A. Phosphorylated Acrylic Polymer

A reactor equipped with a reflux condenser and monomer and initiator feed lines is charged with 5.52 parts by weight of toluene. The toluene is heated to reflux. Then simultaneously and uniformly, a monomer mixture (2.10 parts by weight glycidyl methacrylate, 5.32 parts by weight 2-hydroxyethyl methacrylate, 3.28 parts by weight methyl methacrylate, 0.10 parts by weight toluene, 5.72 parts by weight styrene, and 4.77 parts by weight butyl methacrylate) and an initiator mixture (1.045 parts by weight Vazo® 67 and 1.369 parts by weight toluene) are added to the reactor over 3 hours. The temperature is maintained at reflux for an additional 45 minutes after the additions are completed. Then, an initiator mixture (0.211 parts by weight Vazo® 67 and 0.276 parts by weight toluene) is added over 30 minutes and reflux is then maintained for an additional 1.5 hours. The reaction mixture is cooled to about 50° C., then phosphoric acid (75% aqueous) (0.42 parts by weight), butanol (0.18 parts by weight), are added and the reaction mixture is held at reflux for an additional four hours. Then, deionized water is added (0.23 parts by weight) and the reaction temperature is held for an additional three hours. Next, 0.75 parts by weight of methyl ethanol amine and 0.7 parts by weight propylene glycol phenyl ether are added to the reaction mixture, which is allowed to exotherm. The temperature is then held at about 95° C. for two hours, after which 0.74 parts by weight Tetronic® 901 (available from BASF Corporation) and 9.33 parts by weight of an isocyanurate of isophorone diisocyanate blocked with methyl ethyl ketoxime (70% nonvolatile in methyl isobutyl ketone) are added to the reaction product. Finally, 0.7 parts by weight lactic acid and 1.0 parts by weight of deionized water are added and stirred well, followed by an additional and 65.7 parts by weight of deionized water added in portions over two hours.

Preparation B: Grinding Resin Solution Having Tertiary Ammonium Groups

In accordance with EP 0 505 445 B1, an aqueous-organic grinding resin solution is prepared by reacting, in the first stage, 2598 parts of bisphenol A diglycidyl ether (epoxy equivalent weight (EEW) 188 g/eq), 787 parts of bisphenol A, 603 parts of dodecylphenol, and 206 parts of butyl glycol in a stainless steel reaction vessel in the presence of 4 parts of triphenylphosphine at 130° C. until an EEW (epoxy equivalent weight) of 865 g/eq is reached. In the course of cooling, the batch is diluted with 849 parts of butyl glycol and 1534 parts of D.E.R® 732 (polypropylene glycol diglycidyl ether, DOW Chemical, USA) and is reacted further at 90° C. with 266 parts of 2,2'-aminoethoxyethanol and 212 parts of N,N-dimethylaminopropylamine. After 2 hours, the viscosity of the resin solution is constant (5.3 dPas; 40% in SOL-VENON® PM (methoxypropanol, BASF/Germany); cone and plate viscometer at 23° C.). It is diluted with 1512 parts of butyl glycol and the base groups are partly neutralized with 201 parts of glacial acetic acid, and the product is diluted further with 1228 parts of deionized water and discharged. This gives a 60% strength aqueous-organic resin solution whose 10% dilution has a pH of 6.0. The resin solution is used in direct form for paste preparation.

Preparation C: Pigment Paste

A premix is first formed from 125 parts of water and 594 parts of the grinding resin of Preparation B. Then 7 parts of acetic acid, 9 parts of Tetronic® 901, 8 parts of carbon black, 547 parts of titanium dioxide TI-PURE® R 900 (DuPont, USA), 44 parts of di-n-butyl tin oxide, 47 parts of bismuth subsalicylate, and 120 parts of ASP200 clay (Langer & Co./

Germany) are added. The mixture is predispersed for 30 minutes under a high-speed dissolver stirrer. The mixture is subsequently dispersed in a small laboratory mill (Motor Mini Mill, Eiger Engineering Ltd, Great Britain) until it measures a Hegmann fineness of less than or equal to 12 μm and is adjusted to solids content with additional water. The obtained pigment paste has solids content: 67% by weight (1 hour at 110° C.).

Example 1

A bath was prepared by combining 1096.1 parts Preparation A, 147.3 parts preparation C, and 1256.6 parts deionized water. The water and Preparation A resin emulsion are combined in a container with constant stirring, and Preparation C is added with stirring. The bath solid contents are about 19% by weight.

Example 1 is coated onto both phosphated and bare cold rolled steel 4-inch-by-6-inch test panels at about 225 volts in the Example 1 bath at bath temperatures from 88-98° F. (31-36.7° C.) for 2.2 minutes and the coated panels are baked for 28 minutes at 350° F. (177° C.). The deposited, cured coating layer has a filmbuild of about 0.8 mil (20 μm).

The description is merely exemplary in nature and, thus, variations that do not depart from the gist of the disclosure are a part of the invention. Variations are not to be regarded as a departure from the spirit and scope of the disclosure.

What is claimed is:

1. An aqueous coating composition comprising a binder, the binder comprising a phosphorylated acrylic polymer, wherein the phosphorylated acrylic polymer comprises at least one phosphorous-containing group

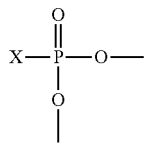

in which X is a hydrogen, a monovalent hydrocarbon group, an alkyl group, an aryl group, an alkylaryl group, an arylalkyl group, or an oxygen atom having a single covalent bond to the phosphorous atom, and each oxygen atom has a covalent bond to a hydrogen atom, an alkyl group, an aryl group, an alkylaryl group, an arylalkyl group, or the acrylic polymer, with the caveat that at least one oxygen atom has a covalent ester bond to the acrylic polymer resulting from esterification of a hydroxyl or epoxide group provided by an ethylenically unsaturated monomer comprising a hydroxyl or epoxide group, wherein the coating composition comprises pigment in an amount of 10-40 percent by weight based on nonvolatile material and wherein the coating composition is cathodically electrodepositable.

2. A coating composition according to claim 1, wherein the coating composition is aqueous and the phosphorylated acrylic polymer is amine functional.

3. A coating composition according to claim 2, wherein the coating composition is free of amine-functional polymers other than the phosphorylated acrylic polymer.

4. A coating composition according to claim 1, wherein the phosphorylated acrylic polymer comprises a monophosphate ester group, a monophosphonic acid ester group, or both.

5. A coating composition according to claim 1, wherein the phosphorylated acrylic polymer comprises a diphosphate ester group, a diphosphonic acid ester group, or both.

6. A coating composition according to claim 1, wherein the phosphorylated acrylic polymer comprises, on average, a plurality of phosphorous-containing groups per molecule.

7. A coating composition according to claim 1, wherein the binder comprises from about 0.01 to about 99% by weight of the phosphorylated acrylic polymer.

8. A coating composition according to claim 1, wherein the binder comprises a second resin that is amine-functional.

9. A coating composition according to claim 1, wherein the binder further comprises a second, amine-functional acrylic polymer.

10. A coating composition according to claim 1, wherein the phosphorylated acrylic polymer comprises a phosphorous-containing group that has at least one P—OH group.

11. A coating composition according to claim 1, wherein the phosphorylated acrylic polymer comprises a triphosphate ester group.

12. An aqueous coating composition according to claim 1, further comprising a crosslinker reactive with the acrylic polymer.

13. An aqueous coating composition according to claim 12, further comprising a second, amine-functional acrylic polymer reactive with the crosslinker, wherein the second amine-functional acrylic polymer does not include phosphorous-containing groups.

14. A method of coating a metal automotive vehicle body, comprising:
(a) cleaning the metal automotive vehicle body;
(b) placing the cleaned metal automotive vehicle body into an aqueous coating composition according to claim 1;
(c) connecting the metal automotive vehicle body as a cathode in an electric circuit and passing a current through the aqueous electrodeposition coating composition to deposit a coating layer onto the metal automotive vehicle body.

15. A method of coating a metal automotive vehicle body according to claim 14, wherein the metal automotive vehicle body is free of a phosphate pre-treatment.

16. A method of coating a metal automotive vehicle body according to claim 14, wherein the phosphorylated acrylic polymer is amine functional.

17. A method of coating a metal automotive vehicle body according to claim 14, wherein the phosphorylated acrylic polymer comprises, on average, a plurality of phosphorous-containing groups per molecule.

18. A method of coating a metal automotive vehicle body according to claim 14, wherein the phosphorylated acrylic polymer comprises a diphosphate ester group, a diphosphonic acid ester group, or both.

19. A method of coating a metal automotive vehicle body according to claim 14, wherein the phosphorylated acrylic polymer is at least about 5 weight percent of the binder.

* * * * *